June 3, 1930. H. JOHNSON ET AL 1,761,987
CANE CUTTING AND DELIVERING MECHANISM
Filed April 24, 1929
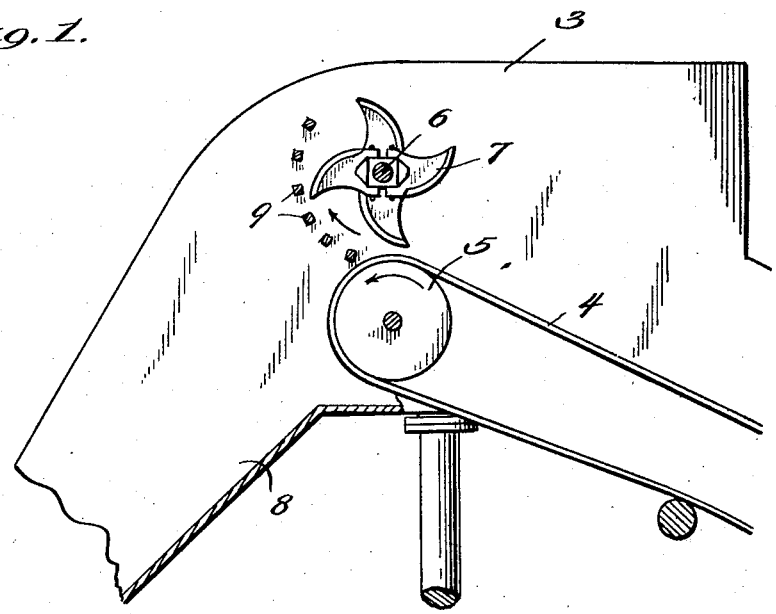
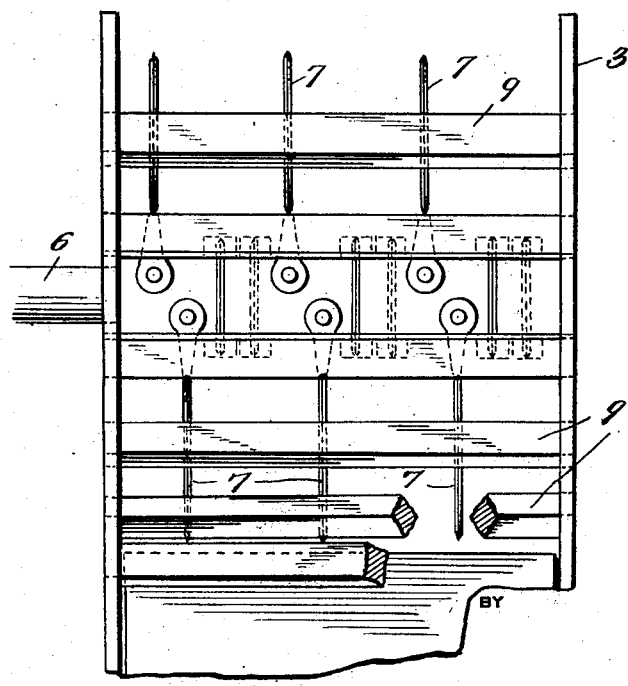
INVENTORS
Horace Johnson
William A. Ramsay
BY
James L. Norris.
ATTORNEY Patented June 3, 1930

1,761,987

UNITED STATES PATENT OFFICE

HORACE JOHNSON AND WILLIAM A. RAMSAY, OF HONOLULU, TERRITORY OF HAWAII

CANE CUTTING AND DELIVERING MECHANISM

Application filed April 24, 1929. Serial No. 357,828.

The present invention relates to improvements in cane cutting and delivering mechanism, one object of the invention being the provision of means disposed to cooperate with the rotary cutters to cut or slice the cane while in transit and which prevents the knives from engaging pieces of cane and throwing the same beyond the knives, and at the same time assists the knives in cutting or slicing such pieces of the cane.

According to the invention a series of bars is disposed at the outlet side of the rotary cutter and disposed in an arc, the center of which is the axis of the cutter, and in such a position that should any of the cane adhere to the knives of the cutter, the said bars will cooperate therewith and exert additional cutting action upon such cane and thereby insure the proper cutting or slicing of the cane before delivery to the crushers and cane mill.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:

Figure 1 is a vertical sectional view of a cane delivery mechanism adjacent the rotary cutter showing the present invention in section and in its operative relation to the cutter;

Figure 2 is a view partly in section and partly in elevation looking toward the cutter and bars from the left, as viewed in Fig. 1.

Referring to the drawings, the numeral 3 designates the main conveying chute through which the cane is delivered by means of the endless conveyor 4 operated upon and guided by the roller 5. Mounted adjacent thereto and above the roller 5 is a transverse shaft 6, which is adapted to be operated at a high speed to actuate the rotary cutters 7 carried thereby, this being of usual construction.

The delivery end 8 of the chute is disposed to receive the cut up or sliced cane and deliver the same to the crushers (not shown).

This much of the apparatus is common and in practice it has been found that the larger pieces of the cane that adhere to or are speared by the knives 7 are sometimes thrown into the chute 8 without being properly cut up. It has therefore been found desirable that a plurality of spaced bars 9, preferably of angular cross section be disposed adjacent the rotary knives, said bars being mounted between the walls of the chute 3 and disposed substantially upon an arc of a circle, the axial center of which is the axis of the shaft 6 and just beyond a circle described by the extreme ends of the knives 7.

Thus it will be seen that cane delivered to and acted upon by the knives will also, if too large to pass between the bars 9, be halted in its movement or impeded to such an extent that the succeeding blades will coact with the bars to additionally cut up and slice the cane so that, when the cane is delivered through the bars 9 and into the delivery chute 8, it will be much more finely cut up and sliced and therefore in a better condition to be acted upon by the crushers and the cane mill.

Although the bars 9 are here shown as rectangular in cross section it is evident that they may be polysided, round, oval or elliptical.

What we claim is:

1. The combination with a rotary cane cutter and a cane delivery mechanism, of means for cooperating with the cutter to prevent the cutter from throwing the cane, before properly cutting up the same into the delivery mechanism and for assisting in cutting up the cane, the latter means including a plurality of spaced bars arranged upon an arc of a circle, the center of which is substantially the axis of the cutter.

2. The combination with a rotary cane cutter and a cane delivery mechanism, of means for cooperating with the cutter to prevent the cutter from throwing the cane, before properly cutting up the same into the delivery mechanism and for assisting in cutting up the cane, the latter means including a plurality of spaced bars arranged upon an arc of a circle, the center of which is substantially the axis of the cutter, said bars being arranged at the outlet side of the cutter.

3. The combination with a rotary cane cutter and a cane delivery mechanism, of means for cooperating with the cutter to prevent the cutter from throwing the cane, before properly cutting up the same into the delivery mechanism and for assisting in cutting up the cane, the latter means including a plurality of spaced bars arranged upon an arc of a circle, the center of which is substantially the axis of the cutter, said bars being angular in cross section and arranged at the outlet side of the cutter.

4. The combination with a rotary cane cutter and a cane delivery mechanism, of means for cooperating with the cutter to prevent the cutter from throwing the cane, before properly cutting up the same into the delivery mechanism and for assisting in cutting up the cane, the latter means including a plurality of spaced bars arranged upon an arc of a circle, the center of which is substantially the axis of the cutter, said bars acting as a grating through which the cut up or sliced cane is forced to pass before entering the delivery mechanism.

In testimony whereof we have hereunto set our hands.

HORACE JOHNSON.
WILLIAM A. RAMSAY.